(12) United States Patent
Liu et al.

(10) Patent No.: US 10,701,928 B2
(45) Date of Patent: Jul. 7, 2020

(54) METHOD FOR ANIMAL TISSUE MATERIAL DISINFECTION AND STERILIZATION AND CORRESPONDING ANIMAL TISSUE SOAK SOLUTION

(71) Applicant: Beijing Ruijian Gaoke Biotechnology Co., Ltd., Beijing (CN)

(72) Inventors: Zhi-gang Liu, Beijing (CN); Xinhua Liu, Beijing (CN)

(73) Assignee: Beijing Ruijian Gaoke Biotechnology Co., Ltd., Beijing (CN)

( * ) Notice: Subject to any disclaimer, the term of this patent is extended or adjusted under 35 U.S.C. 154(b) by 568 days.

(21) Appl. No.: 14/914,298

(22) PCT Filed: May 29, 2014

(86) PCT No.: PCT/CN2014/078739
§ 371 (c)(1),
(2) Date: Feb. 25, 2016

(87) PCT Pub. No.: WO2015/027728
PCT Pub. Date: Mar. 5, 2015

(65) Prior Publication Data
US 2016/0212986 A1 Jul. 28, 2016

(30) Foreign Application Priority Data

Aug. 26, 2013 (CN) .......................... 2013 1 0376627

(51) Int. Cl.
*A01N 1/02* (2006.01)

(52) U.S. Cl.
CPC ................................. *A01N 1/0215* (2013.01)

(58) Field of Classification Search
CPC .................................................. A01N 1/0215
See application file for complete search history.

(56) References Cited

U.S. PATENT DOCUMENTS

| | | | |
|---|---|---|---|
| 3,852,210 A | * | 12/1974 | Krezanoski ............. A61K 8/22 510/372 |
| 5,019,289 A | | 5/1991 | Gray et al. |
| 6,024,735 A | * | 2/2000 | Wolfinbarger, Jr. ......... A61B 17/3472 128/898 |
| 6,482,584 B1 | | 11/2002 | Mills et al. |
| 6,933,103 B1 | | 8/2005 | Klein et al. |
| 8,735,054 B1 | | 5/2014 | Sun et al. |
| 9,150,318 B1 | * | 10/2015 | Sun .......................... B65B 55/02 |
| 2004/0057936 A1 | | 3/2004 | Cheung |
| 2005/0238688 A1 | | 10/2005 | Klein et al. |
| 2008/0077251 A1 | | 3/2008 | Chen et al. |
| 2010/0068690 A1 | | 3/2010 | Liotta et al. |

FOREIGN PATENT DOCUMENTS

| | | | | |
|---|---|---|---|---|
| CN | 1267201 A | | 9/2000 | |
| CN | 102580153 A | | 7/2012 | |
| CN | 103418001 A | | 12/2013 | |
| CN | 203447388 U | | 2/2014 | |
| GB | 965672 A | * | 8/1964 | ............ C11D 3/392 |
| JP | H06261933 A | | 9/1994 | |

OTHER PUBLICATIONS

European Search Report dated Jan. 16, 2017 of Application Serial No. EP14839546.
Japanese Office Action of Serial No. 2016-537094, dated Feb. 7, 2017.
International Search Report of PCT/CN2014/078739, dated Sep. 1, 2014.

* cited by examiner

*Primary Examiner* — Amy L Clark
(74) *Attorney, Agent, or Firm* — Banner & Witcoff, Ltd.

(57) ABSTRACT

A method for disinfecting and sterilizing an animal tissue material and a corresponding soak solution for an animal tissue. The method includes placing the animal tissue material into an alkaline soak solution containing a metal peroxide and a detergent, and shaking; removing organic components released from microorganisms and animal tissue cells by soaking and washing in a neutral cleaning solution; washing the tissue matrix with a weak acidic cleaning solution; cryopreserving or freeze-drying the tissue matrix in a neutral solution. The soak solution for the animal tissue contains 0.01~0.2% (w/v) of the metal peroxide and 0.05~1.0% (w/v) of the detergent. The animal tissue pretreated by the method is advantageous to the preservation and further decellularization treatment of the tissue for manufacture of an intact scaffold material of a tissue matrix.

10 Claims, 4 Drawing Sheets

METHOD FOR ANIMAL TISSUE MATERIAL DISINFECTION AND STERILIZATION AND CORRESPONDING ANIMAL TISSUE SOAK SOLUTION

TECHNICAL FIELD

Examples of the present application relates to, but is not limited to, the technical field of treatment of biological tissues and manufacture of tissue matrix materials, and in particular, relates to, but is not limited to, a method for disinfecting and sterilizing a material of an animal tissue and a corresponding soak solution for an animal tissue.

BACKGROUND OF THE RELATED ART

A decellularized matrix of a tissue and organ has been used for human tissue restoration, various tissue engineering studies and regenerative medicine researches. There are great similarity and homology in the extracellular matrices of tissues and organs of human bodies and many animals. A biological matrix material manufactured by decellularizing an allogeneic or xenogenic tissue and organ has been successfully used for repair and restoration of human tissues in clinical medicine. After a good matrix of a tissue and organ is implanted into the host, the matrix scaffold material provides an initial biomechanical support and regulates cell behavior (e.g., adherence, migration, proliferation and differentiation) by interacting with a host cell, and the matrix of the tissue and organ itself is gradually converted into a new tissue with ingrowth of the host cells.

After removal of original cell components of a tissue and organ of an animal, the matrix of the tissue and organ having a three-dimensional scaffold structure can also be re-cellularized and functionalized by incorporating human cells in vitro, thereby finally producing a tissue and organ which can be implanted into the human body.

A matrix of a tissue and organ is a three-dimensional scaffold composed of various complex structural proteins and functional proteins, and comprises many other active complexes. Main components include collagenous fiber, glycoprotein, mucoprotein, and the like, and other components include saccharides such as glycosaminoglycan (hyaluronic acid, chondroitin sulfate), some lipids and growth factors. A process procedure for manufacturing the matrix of the tissue and organ is very complex, including processes such as collection, preservation, washing, disinfection, decellularization, antigenicity reduction, virus inactivation and terminal sterilization of the tissue and organ, and the like. Among these processes, the disinfection and sterilization treatment of the animal tissue causes great damage on the matrix of the tissue and organ, which severely changes biochemical constituents of the matrix of the tissue and organ while inactivating bacteria and viruses, thereby disrupting the three-dimensional ultrastructures and altering biomechanical properties. These changes influence the response of the host to the implanted matrix material, and possibly result in the less desirable clinical outcomes of the product of the tissue matrix, and thus making it difficult to achieve proper human tissue repair.

The method for disinfection, sterilization and virus inactivation of the material of the animal tissue is used throughout each process step of the manufacture process for the scaffold of the tissue matrix. Currently, applicable methods mainly relate to several methods as follows. The first one is a physical method, which decreases the number of bacteria and fungi by flushing and diluting, and operates under a sterile environment to prevent a re-infection; the second one is to add a microbial growth inhibitor and an antibiotic in a preparation solution; the third one is to incorporate a special sterilization step into the preparation process procedure, so as to control the number of bacteria; and the fourth one is terminal sterilization treatment of the product. The sterilization method in the preparation process procedure is to treat with a chemical oxidant (peracetic acid, sodium hypochlorite, hydrogen peroxide or iodine solution, or the like), alcohol, or acid or base (acetic acid, hydrochloric acid, sodium hydroxide). The test results indicate that these commonly used methods for disinfection and sterilization treatment have different degrees of damage on the tissue matrix. One of the issues required to be further studied in the field of tissue engineering science and biological material science is how to disinfect, sterilize, and inactivate viruses more effectively, without damaging the original basic structure of the extracellular tissue matrix, and changing the main biochemical constituents and biomechanical properties.

CONTENT OF THE INVENTION

Subject matters of the detailed description in the present application are summarized as follows, which is not intended to limit the protection scope defined in the claims.

In a first aspect, the examples of the present invention provide a method for disinfecting and sterilizing a material of an animal tissue, which comprises the steps of:

(1). placing the material of the animal tissue in an alkaline soak solution containing a metal peroxide and a detergent, and shaking;

(2). washing the material of the animal tissue obtained in step (1) with a neutral cleaning solution to remove organic components released from microorganisms and animal tissue cells during soaking;

(3). washing the tissue matrix obtained in step (2) with a weak acidic cleaning solution;

(4).cryopreserving or freeze-drying the tissue matrix obtained in step (3) in a neutral solution.

In some embodiments, the soak solution for the animal tissue in step (1) contains 0.01~0.2% (w/v) of the metal peroxide and 0.05~1.0% (w/v) of the detergent, and pH of the solution is between 9.0~12.0. The metal peroxide is selected from one or more of the group consisting of calcium peroxide, magnesium peroxide, sodium peroxide or barium peroxide, and the detergent is selected from one or more of the group consisting of Triton X-100, sodium deoxycholate or sodium dodecyl sulfonate.

Calcium peroxide, also referred to as calcium dioxide, is used as a non-toxic disinfectant for seed and cereal in agriculture; used as an additive in manufacture of food, cosmetics, and the like; and used as a high temperature oxidant or an oxygen producer in manufacture of medicine. Therefore, in a more preferable embodiment of the present invention, the metal peroxide is a low concentration of or supersaturated alkaline aqueous solution of calcium peroxide, the content of which is generally between 0.01~0.2% (w/v) (which corresponds to 0.01~0.2 g of calcium peroxide per 100 mL solution, with "w/v" hereinafter having the same meaning). The content of calcium peroxide in practical applications may be adjusted depending on the ratio of the volume of the solution to the original material of the tissue and organ of the animal, such as, 0.01%, 0.02%, 0.03% —, up to any concentration not more than 0.2% (w/v). Furthermore, in addition to calcium peroxide, the metal peroxide, which can be used in the examples of the present invention, may also include, but be not limited to, sodium peroxide, magnesium peroxide, barium peroxide, and other metal peroxides.

In the process of using the aqueous solution of calcium peroxide or other metal peroxides in the examples of the present invention, an initial pH of the soak solution can further be adjusted to pH between 8.5~12.5, preferably 9.0~12.0, more preferably 9.5~11.5, with a solution of sodium carbonate, sodium bicarbonate, sodium hydroxide, acetic acid, hydrochloric acid or the like. The final content of sodium carbonate and sodium bicarbonate may be between 0.01~2.0% (w/v), and the content of sodium hydroxide may be between 1.0~100 mM. Preferably, the content of sodium carbonate and sodium bicarbonate may be between 0.5~1.0% (w/v), and the content of sodium hydroxide may be between 5~10 mM. The content of each component in practical applications may be varied depending on the ratio of the volume of the solution to the original material of the tissue and organ of the animal.

The metal peroxide in the examples of the present invention may be used in combination with a low concentration of a detergent or a decontaminant which could not cause the denaturation of tissue matrix proteins. There are many kinds of detergents or decontaminants suitable for this application, including an ionic surfactant and a nonionic surfactant. Triton X-100, sodium deoxycholate, sodium dodecyl sulfonate, sodium aliphatate, 3 —[(3-cholesterolaminopropyl) dimethylamino]-1-propanesulfonic acid, poly(ethylene glycol)methylether methacrylic acid, and polyethylene glycol, and the like are commonly used. Preferably, one or more of Triton X-100, sodium deoxycholate and sodium dodecyl sulfonate are used. The concentration of Triton X-100 in the solution may be between 0.05~1.0% (w/v), the concentration of sodium deoxycholate may be between 0.1~1.0% (w/v), and the concentration of sodium dodecyl sulfonate may be between 0.05~1.0% (w/v).

In the soak solution of the examples of the present invention, protease inhibitors, such as phenylmethylsulfonyl fluoride and/or N-ethylmaleimide, may be added as required to prevent protease released after cell lysis from damaging the tissue matrix material.

In some embodiments, when pretreating the material of the tissue and organ of the animal in step Oh the tissue material may be soaked in the soak solution at the temperature of 5~42° C. and then shaken. The volume of the solution used is generally 1~10 times as much as the weight of the tissue material. The pretreatment time is generally between 6~48 hours. Meanwhile, it may be appropriately adjusted depending on the treatment temperature, the type of the tissue material, the number of the bacteria present and the ratio of volume to weight.

The method for disinfection and sterilization of the examples of the present invention further comprises completely washing the tissue material after being soaked for disinfection and sterilization. In some embodiments, step 2 may be performed with a neutral cleaning solution, which is pure water, a normal saline or a biological buffer solution that is obtained by sterile filtration, such as 10 mM of hydroxyethylpiperazine ethane sulfonic acid. The specific method is to wash the tissue material with pure water, a normal saline or a biological buffer solution for 2~5 times, each time for 1~3 hours.

In the method for disinfection and sterilization of the examples of the present invention, after being completely washed with the neutral cleaning solution, the tissue material is further required to be washed with a weak acidic cleaning solution. The weak acidic cleaning solution in step (3) is a normal saline or a buffer solution of 2~20 mM of hydroxyethylpiperazine ethane sulfonic acid, which is obtained by adjusting pH to 5.0~6.0 with acetic acid, sodium acetate or hydrochloric acid and by sterile filtration. The specific method is to wash the tissue material with the weak acidic cleaning solution for 2-5 times, each time for 1~3 hours.

The washed tissue matrix of the examples of the present invention is placed in a neutral preservation solution to be cryopreserved or to be freeze-dried. The neutral solution in step (4) is a buffer solution of 2~20 mM of hydroxyethylpiperazine ethane sulfonic acid or other compatible biological buffer solution, with a pH between 7.0~8.0.

When carrying out the method of the examples of the present invention, after eliminating the soak solution for the tissue material, a suitable antibiotic can also be added in the subsequent cleaning solution, such as a solution containing 100 mg of gentamicin per litre. The tissue material may be temporarily preserved at 5~10° C. in the solution into which an antibiotic is added.

In a second aspect, the examples of the present invention further provide a soak solution for an animal tissue for disinfecting and sterilizing a material of an animal tissue, which contains 0.01-0.2% (w/v) of metal peroxide and 0.05~1.0% (w/v) of detergent, and pH of the solution is preferably between 9.0-2.0, more preferably between 9.5-11.5. The metal peroxide is selected from one or more of the group consisting of calcium peroxide, magnesium peroxide, sodium peroxide or barium peroxide, and the detergent is selected from one or more of the group consisting of Triton X-100, sodium deoxycholate or sodium dodecyl sulfonate.

In a third aspect, the examples of the present invention further provide an animal tissue matrix manufactured by disinfection and sterilization of a material of an animal tissue according to the method described above.

With respect to the problems present in disinfection, sterilization and virus inactivation of a raw material in various manufacture technologies of the prior art, the examples of the present invention provide a method for disinfecting and sterilizing a material of an animal tissue and a corresponding soak solution for an animal tissue, as well as an animal tissue matrix obtained by this method. By using this method and this solution, the number of bacteria in the manufactured material of the animal tissue may be decreased by at least $10^6$, without damaging the basic scaffold structure, main biochemical components and biomechanical properties of the extracellular matrix material of the original tissue of the animal. Meanwhile, a low concentration of detergent which cannot cause protein denaturation is used in combination with the examples of the present invention, to facilitate the lysis and rupture of the animal cells, and release intracellular organic components, thereby being capable of removing some components of the animal cell from the tissue during the soaking and washing processes. Furthermore, the method for disinfection and sterilization of the examples of the present invention is safe, green and environmentally protective, does not relate to the use of toxic chemical substances, and does not leave chemical residual substances in the scaffold of the tissue matrix either.

Other aspects may be apparent to a person skilled in the art after reading and understanding the drawings and detailed description of the present invention.

Left-hand diagram: control;

Right-hand diagram: for the material treated with a calcium peroxide solution for 24 hours, no bacterium is observed by detection.

Figure 2:
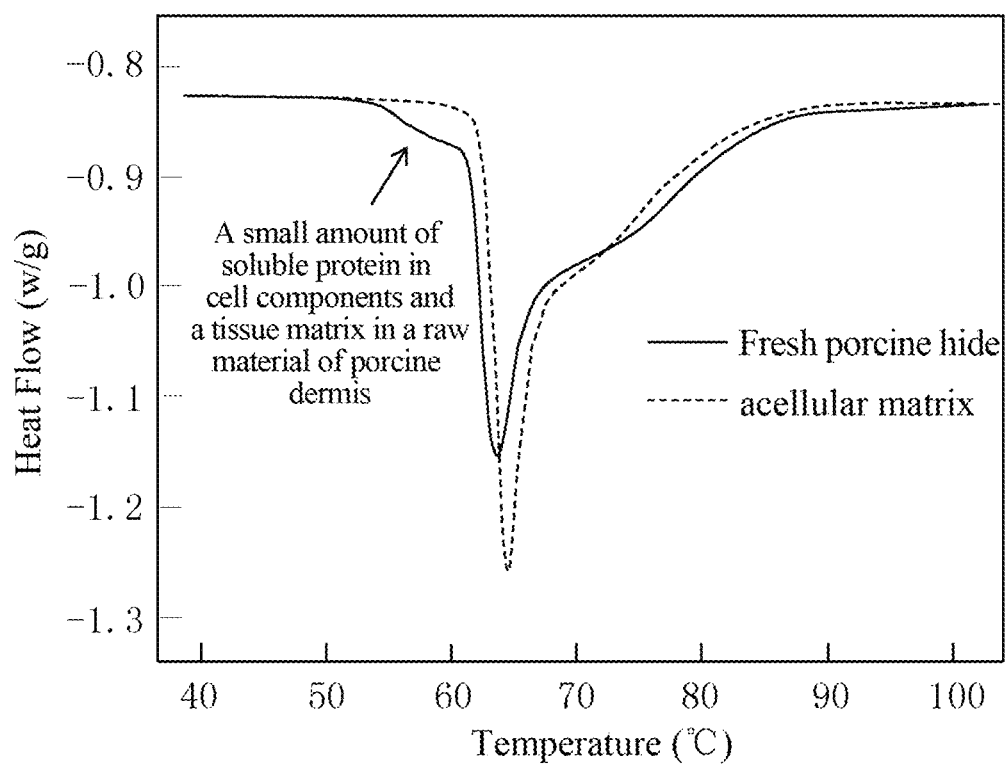

FIG. 2: The differential scanning calorimetric thermogram of the porcine dermal matrix treated with 0.1% calcium peroxide solution (initial pH, 11.6).

Figure 3:
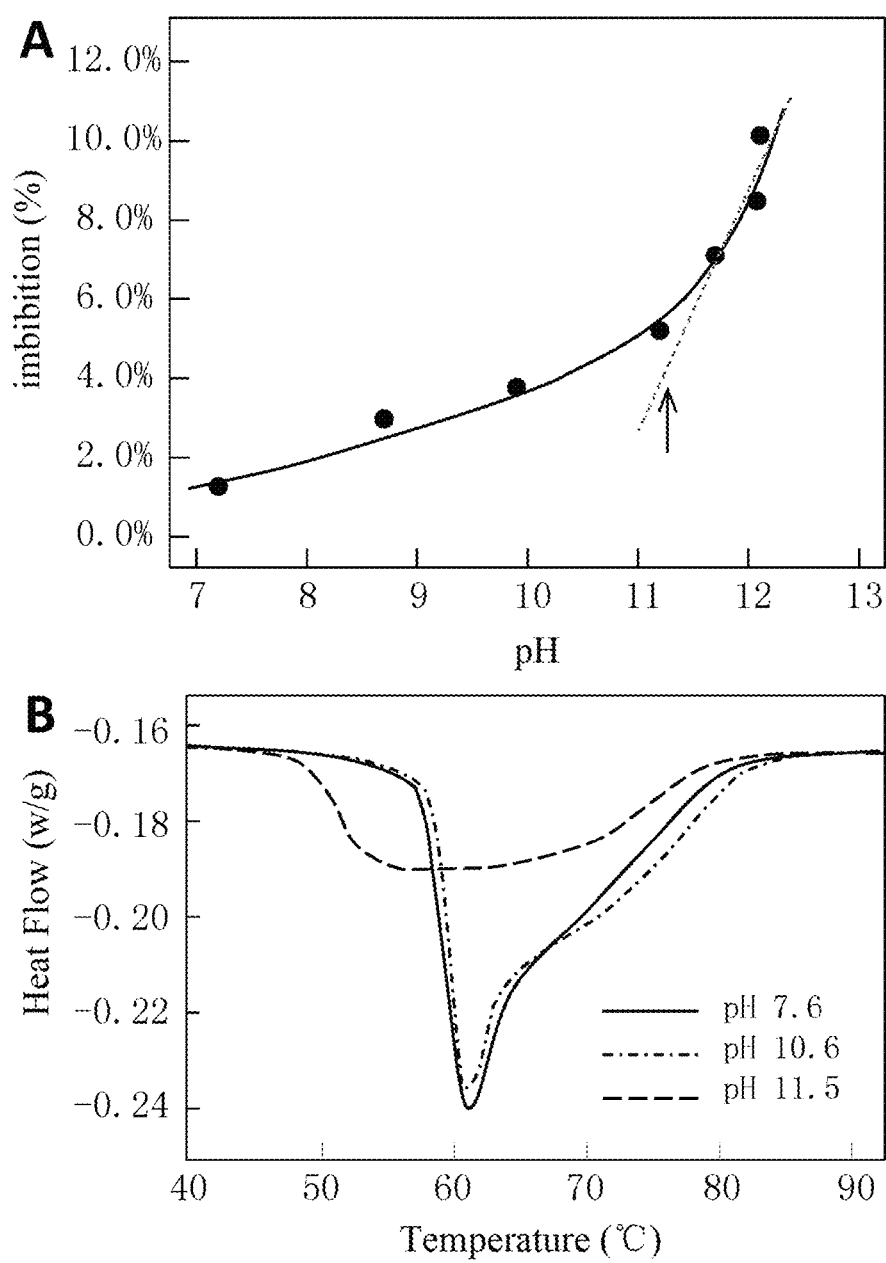

FIG. 3: Imbibition of the porcine hide dermal material in the solutions with different pH (FIG. A) and the differential scanning calorimetric thermogram of the tissue matrix treated with the solutions of different pH for disinfection and sterilization (FIG. B).

Figure 4:
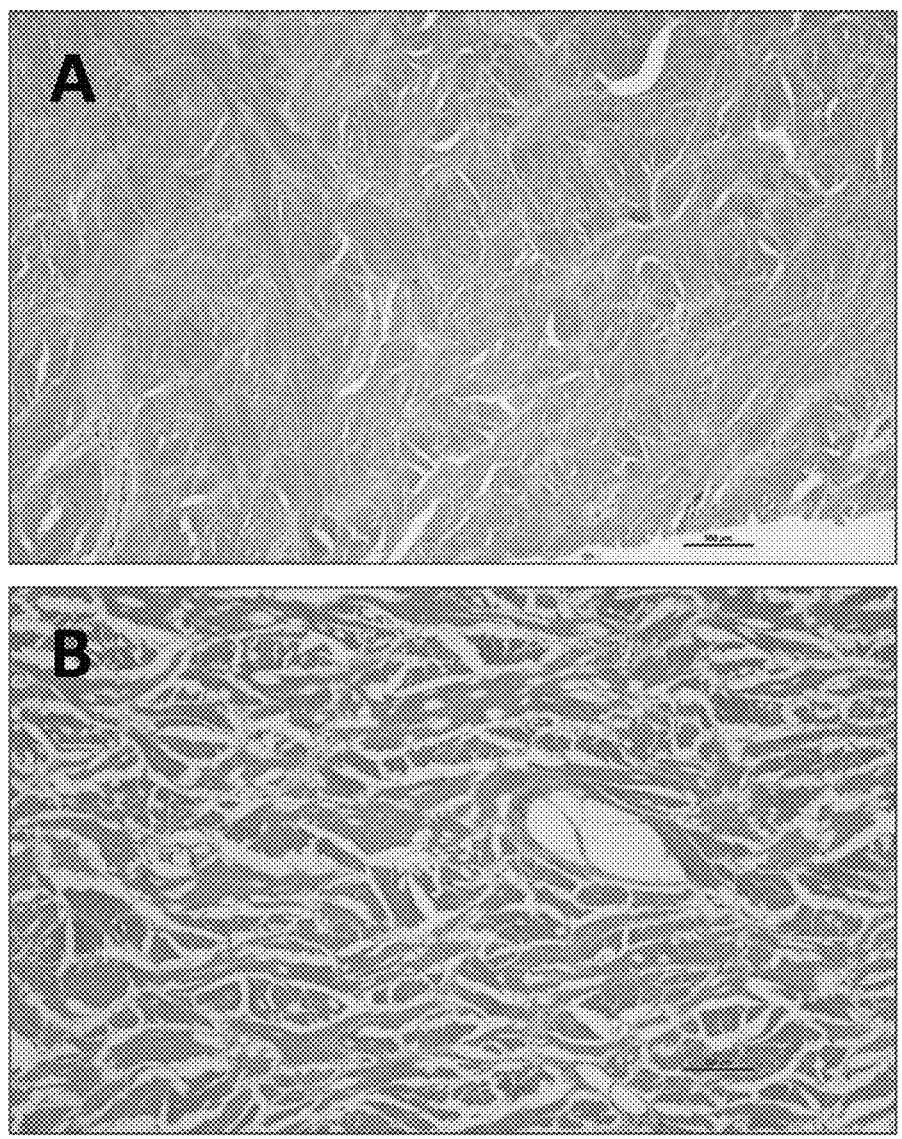

FIG. 4: HE staining histology of tissue sections of porcine acelluar dermal tissue matrix pretreated with a high pH (12.2) solution for disinfection and sterilization;

A: untreated porcine dermal tissue;

B: the tissue matrix material after disinfection and sterilization and decellularization treatment.

Figure 5:
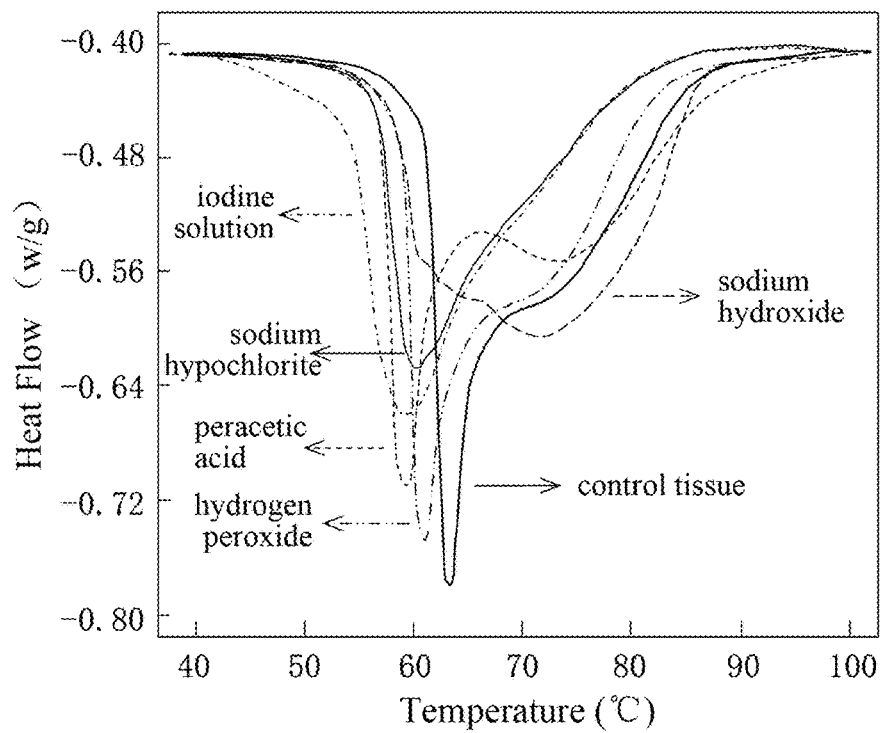

FIG. 5: The differential scanning calorimetric thermogram of the tissue matrix scaffolds damaged by several methods for disinfection and sterilization.

Figure 6:
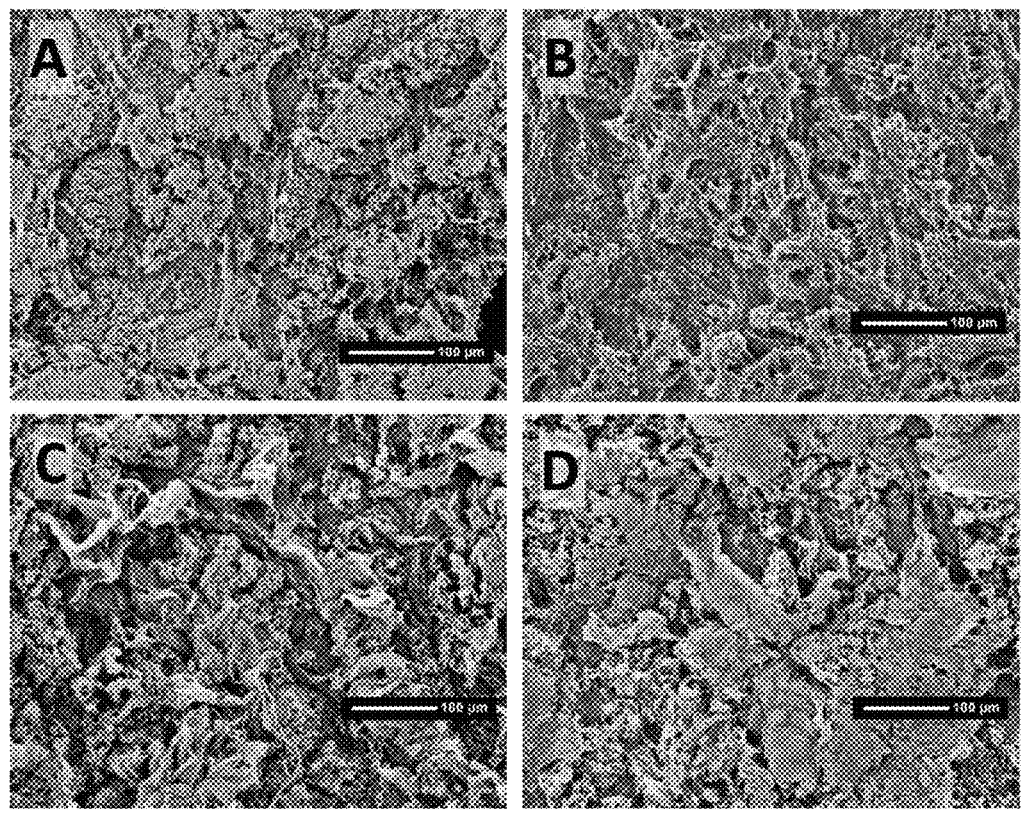

FIG. 6: Scanning electronic micrographs of the structure of the tissue matrix changed by several methods for disinfection and sterilization.

A: a phosphate buffer solution for control;

B: 1N sodium hydroxide (1 hours);

C: 0.2% peracetic acid (2 hours);

D: 3.0% hydrogen peroxide (2 hours).

DETAILED DESCRIPTION OF EMBODIMENTS

The present invention is further illustrated in detail by way of examples hereinafter, which are intended to illustrate rather than to limit the present invention. Further, it should be noted by those skilled in the art that several improvements and modifications can be made to the present invention, without departing from the principle of the present invention, and these improvements and modifications also fall within the protection scope of the present invention.

EXAMPLE 1

Figure 1:
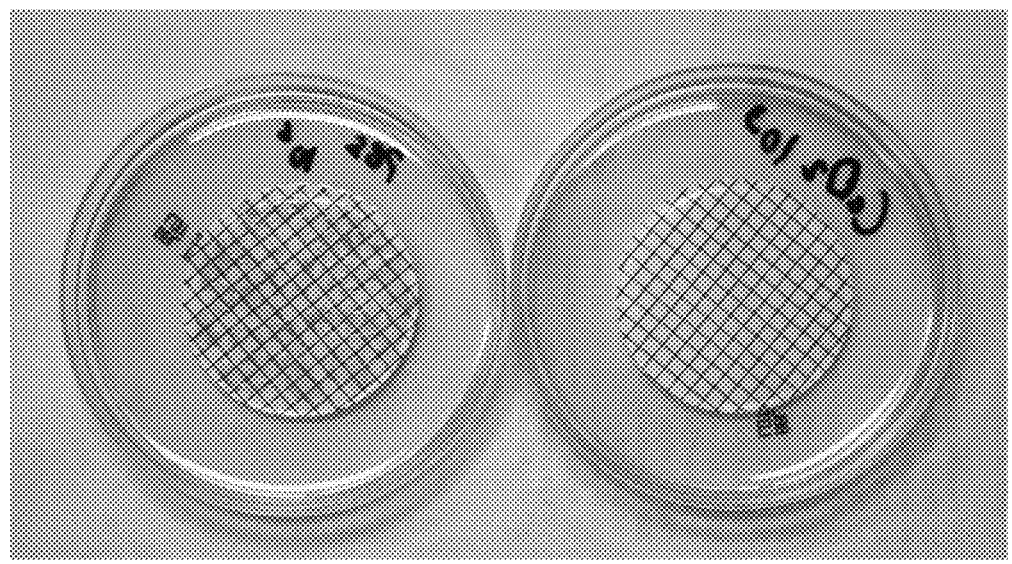
FIG. 1: Diagrams of effect of disinfecting and sterilizing porcine hide with a 0.1% calcium peroxide solution.

Disinfection and Sterilization of a Material of an Animal Tissue and Effect on Decellularization Thereof Four 9-month-old pigs were slaughtered, and firstly dehaired. A fresh porcine hide with a thickness of 1~2 mm (without subcutaneous fat) was collected from each animal. The porcine dermis was cut into small pieces with a length of 3 cm and a width of 3 cm, and placed in a 250 mL plastic bottle. Four bottles were prepared for each animal lot, and 20 g of the porcine dermal material was placed in each bottle. Among the above 4 bottles, to each of two bottles was added 125 mL of phosphate buffer solution (initial pH, 7.5) serving for control, to one of the other two bottles was added 125 mL of 0.1% calcium peroxide solution (initial pH, 11.6), and to another one of the other two bottles was added 125 mL of a solution (initial pH, 11.6) of 0.1% calcium peroxide and 0.1% Triton X-100. After being agitated and soaked for 1 hour, one bottle with phosphate buffer solution for control was used to determine the initial number of viable bacteria. After, the test solution was diluted by different times (10, 1000 and 1000000 times), 100 μL of samples diluted by different times were filtered and washed separately, the filters were incubated in nutrient agar/broth medium for 24 hours (at 37° C.), and then the number of viable bacteria was counted. All of the test bottles were washed in a rotary shaker (50 revolutions per minute) overnight for 24 hours. The effect of disinfection and sterilization of the raw material of the tissue was measured by determination of the number of viable bacteria. The results showed that the initial number of viable bacteria in the bottle was averagely $10^{8.7}$ (±0.1, N=4); in the phosphate buffer solution for control, after 24 hours, the number of viable bacteria was increased by 245 times, averagely $10^{11.1}$ (±0.1, N=4); and in the calcium peroxide solution, no viable bacterium was detected, see FIG. 1 for details.

The porcine hide tissue that was pretreated with a solution of 0.1% calcium peroxide and 0.1% Triton X-100 was further treated by decellularization, for evaluating the effect of the disinfection and sterilization pretreatment on the subsequent processes. After being washed with a sterile normal saline (0.9% sodium chloride) twice, the porcine hide tissue was added in 100 mL of 0.5% sodium deoxycholate (dissolved in a buffer solution of 5 mM hydroxyethylpiperazine ethane sulfonic acid, pH 8.0). After being decellularized by soaking for 22 hours, the porcine hide tissue was washed with a sterile normal saline for five times, each time for 2 hours. The effect of disinfection and sterilization pretreatment on the tissue matrix was analyzed by using a differential scanning calorimeter. The analysis was performed in a phosphate buffer solution (pH=7.5) by using a differential scanning calorimeter, and the temperature was increased from 2° C. to 125° C. at a rate of temperature increase of 2° C. per minute. The onset temperature of denaturation of the untreated fresh porcine hide tissue matrix was 60.5±0.3° C., with an enthalpy value of 65.2±1.4 J/g (N=3). The onset temperature of denaturation of the pretreated tissue matrix was 61.9±0.2° C., with an enthalpy value of 62.3±1.1 J/g (N=3). The determination results indicated that no dermal tissue matrix was damaged by the disinfection and sterilization pretreatment of the examples of the present invention, as compared with the fresh porcine dermis, see FIG. 2 for details.

EXAMPLE 2

Disinfection and Sterilization of a Material of an Animal Tissue

A six-month-old pig was slaughtered, treated by surface cleaning and dehaired. A fresh porcine hide was cut, and subcutaneous fat thereof was scraped (2-3 mm thick). The collected raw material of the porcine hide was temporarily stored in an environment of 5-10° C. The porcine dermis was cut into big pieces with a length of about 30 cm and a width of about 30 cm, and placed in a solution of 2% sodium carbonate+0.2% Triton X-100 (with the initial pH being adjusted to 12.0~12.2 with a saturated concentrated solution of calcium peroxide), with each 400 g of the raw material of the porcine hide in 1 litre of the solution. The sample was washed in a rotary shaker (90 revolutions per minute) overnight (16-24 hours). After eliminating the soak solution, it was flushed with pure water containing 100 mg gentamicin per litre under an aseptic environment, and then further washed twice after pH being adjusted to 5.0-6.0 with 1N hydrochloric acid. It was further washed twice again after pH being adjusted to 7.0-8.0 with 1N hydrochloric acid, thereby completing the disinfection and sterilization pretreatment of the raw material of the tissue.

EXAMPLE 3

Disinfection and Sterilization of a Material of an Animal Tissue and Effect on a Tissue Matrix Thereof A six-month-old pig was slaughtered, treated by surface cleaning and dehaired. A fresh porcine hide was cut, and subcutaneous fat thereof was scraped. The collected raw material of the porcine hide was temporarily stored in an environment of 5-10° C. The porcine dermis was cut into big pieces with a length of about 30 cm and a width of about 30 cm, and placed in a solution of 0.5% sodium carbonate+ 0.1% Triton X-100 (the initial pH was adjusted to 11.0 with a saturated solution of calcium peroxide), with each 100 g of the raw material of the porcine hide in 1 litre of the solution. The sample was washed in a rotary shaker (60 revolutions per minute) overnight (16-24 hours). After eliminating the soak solution, it was washed with pure water containing 100 mg gentamicin per litre, and then pH was adjusted to 7.0-8.0 with 0.2M acetic acid, thereby completing the disinfection and sterilization pretreatment of the raw material of the tissue. The effect of pretreatment on the tissue matrix was analyzed by using a differential scanning calorimeter, the analysis was performed in a phosphate buffer solution (pH=7.5) by using a differential scanning calorimeter, and the temperature was increased from 2° C. to 125° C. at a rate of temperature increase of 2° C. per minute. The initial temperature of denaturation of the untreated fresh porcine hide tissue matrix was 60.5±0.3° C., with an enthalpy value of 65.2±1.4 J/g (N=3). The initial temperature of denaturation of the pretreated tissue matrix was 61.9±0.4° C., with an enthalpy value of 66.7±1.5 J/g (N=3). The determination results indicated that no dermal tissue matrix was damaged by the disinfection and sterilization pretreatment of the examples of the present invention, as compared with the fresh porcine dermis.

EXAMPLE 4

A Suitable pH of a Soak Solution for Disinfection and Sterilization of an Animal Tissue The disinfection and sterilization solution would be reacted with the raw material of the porcine hide. After the fresh porcine hide material was added, pH was significantly reduced. A suitable pH of calcium peroxide solution was determined in this example. In this test, the fresh porcine hide with a thickness of 1~2 mm was placed in a solution of sodium bicarbonate (1%) and calcium peroxide (0.1%), pH of which was previously adjusted to different values with sodium hydroxide, and changes of the tissue during the pretreatment were evaluated from the imbibition of the raw material. After being washed with a sterile normal saline (0.9% sodium chloride), the pretreated porcine hide tissue was further added in 0.5% sodium deoxycholate (dissolved in a buffer solution of 5 mM hydroxyethylpiperazine ethane sulfonic acid, pH 8.0), decellularized by soaking overnight. The decellularized tissue matrix was washed with a sterile normal saline for five times, each time for 2 hours. The differential scanning calorimetric analysis indicated that when pH was more than 11.5, the imbibition of the porcine hide was significantly increased, the tissue matrix would be irreversibly changed, and the tissue matrix appeared to be unstable, see FIG. 3 for details. The study of the tissue histology also showed that when pH was more than 11.5, the tissue matrix structure was damaged, see FIG. 4 for details. Furthermore, during the practical application, whether the pH of the solution will cause the irreversible change of the tissue matrix or not may further depend on factors such as the treatment time and the volume ratio of the tissue matrix to the solution.

EXAMPLE 5

Damage of a Tissue Matrix Material Caused by Existing Methods for Disinfection and Sterilization To compare the damage of the tissue matrix material caused by the existing methods for disinfection and sterilization, in the test of this example, fresh porcine hides with a thickness of about 1 mm were placed in several kinds of different solutions, including 0.2% sodium hypochlorite (2 hours), 0.2% peracetic acid (2 hours), 3.0% hydrogen peroxide (2 hours), 7.5% iodine solution (2 hours), 1N sodium hydroxide (1 hour) and phosphate buffer solution for control (pH, 7.5). After being treated in these solutions, the porcine hide tissues were completely washed with a phosphate buffer solution (5 times, each time for two hours). The analysis results obtained by a differential scanning calorimeter indicated that these commonly used methods for disinfection and sterilization treatment had different degrees of damage on the tissue matrix, particularly sodium hydroxide, sodium hypochlorite and iodine solution, see FIG. 5 for details. Some changes of the tissue matrix structure could be clearly observed in scanning electronic micrographs, see FIG. 6 for details. However, unlike these existing methods for disinfection and sterilization, a hydrous metal oxide or metal peroxide used in combination with a low concentration of a detergent at a suitable pH (e.g., 8.5~12.5 alternatively, 10.0~11.5) in the examples of the present invention, did not damage the basic scaffold structure, main biochemical components and biomechanical properties of the extracellular matrix material of the original tissue of the animal.

It should be noted that the above description merely illustrates preferable examples of the present invention, rather than hereby limits the protection scope of the present invention, and the above technical solutions of the present invention may be improved, or replaced with technical equivalents. Therefore, the equivalent structure variations made by using the content of the specification and the drawings of the present invention, and its direct or indirect applications in the other related technical field are encompassed in the scope defined by the present invention.

What we claim is:

1. A method for disinfecting and sterilizing an animal tissue, comprising the steps of:
   (a) placing the animal tissue in an alkaline soak solution containing a metal peroxide and a detergent, and shaking;
   (b) washing the animal tissue obtained in step (a) with a neutral cleaning solution to remove organic components released from microorganisms and animal tissue cells during soaking, to obtain an animal tissue matrix;
   (c) washing the animal tissue matrix obtained in step (b) with a weak acidic cleaning solution;
   (d) cryopreserving or freeze-drying the animal tissue matrix obtained in step (c) in a neutral solution;
   wherein the animal tissue is dermis tissue, and wherein the alkaline soak solution in step (a) contains 0.01~0.2% w/v of the metal peroxide and 0.05~1.0% w/v of the detergent, and the pH of the soak solution is between 9.5~11.5.

2. The method according to claim 1, wherein the metal peroxide is selected from one or more of the group consisting of calcium peroxide, magnesium peroxide, sodium peroxide or barium peroxide, and the detergent is selected from one or more of the group consisting of polyethylene glycol octylphenol ether, sodium deoxycholate or sodium dodecyl sulfonate.

3. The method according to claim 1, wherein the step (a) is to soak each kilogram of the animal tissue in 2~8 liter of the alkaline soak solution at the temperature of 5~42° C. for 6~48 hours, and shake during the soaking.

4. The method according to claim 1, wherein the neutral cleaning solution in step (b) is pure water, a saline or a biological buffer solution which is obtained by sterile filtration.

5. The method according to claim 1, wherein the animal tissue in step (b) is washed with the neutral cleaning solution for 2~5 times, each time for 1~3 hours.

6. The method according to claim 1, wherein the weak acidic cleaning solution in step (c) is a saline or a buffer solution of 2~20 mM of hydroxyethylpiperazine ethane sulfonic acid, the saline or the buffer solution is obtained by adjusting pH to 5.0-6.0 with acetic acid, sodium acetate or hydrochloric acid and by sterile filtration.

7. The method according to claim 1, wherein the animal tissue matrix in step (c) is washed with the weak acidic cleaning solution for 2-5 times, each time for 1~3 hours.

8. The method according to claim 1, wherein the neutral solution in step (d) is a buffer solution of 2~20 mM of hydroxyethylpiperazine ethane sulfonic acid with a pH between 7.0~8.0.

9. The method according to claim 1, wherein the alkaline soak solution further comprises a protease inhibitor which is selected from phenylmethylsulfonyl fluoride and/or N-ethylmaleimide.

10. The method according to claim 2, wherein the step (a) is to soak each kilogram of the animal tissue in 2~8 liter of the alkaline soak solution at the temperature of 5~42° C. for 6~48 hours, and shake during the soaking.

* * * * *